(12) United States Patent
Hiraiwa et al.

(10) Patent No.: US 11,007,970 B2
(45) Date of Patent: May 18, 2021

(54) AIRBAG DEVICE

(71) Applicant: TOYODA GOSEI CO., LTD., Kiyosu (JP)

(72) Inventors: Takuya Hiraiwa, Kiyosu (JP); Shinichi Ishida, Kiyosu (JP); Keita Suzuki, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 126 days.

(21) Appl. No.: 16/528,841

(22) Filed: Aug. 1, 2019

(65) Prior Publication Data

US 2020/0070765 A1    Mar. 5, 2020

(30) Foreign Application Priority Data

Aug. 31, 2018    (JP) .............................. JP2018-163650

(51) Int. Cl.
     *B60R 21/239*      (2006.01)
     *B60R 21/203*      (2006.01)
     *B60R 21/2338*     (2011.01)

(52) U.S. Cl.
     CPC .......... *B60R 21/239* (2013.01); *B60R 21/203* (2013.01); *B60R 2021/2395* (2013.01); *B60R 2021/23388* (2013.01)

(58) Field of Classification Search
     CPC ................ B60R 21/239; B60R 21/203; B60R 2021/23388; B60R 2021/2395
See application file for complete search history.

(56) References Cited

U.S. PATENT DOCUMENTS

| | | | | |
|---|---|---|---|---|
| 7,661,708 | B2* | 2/2010 | Szidzek ................ | B60R 21/239 280/743.1 |
| 7,762,584 | B2* | 7/2010 | Morita .................. | B60R 21/239 280/739 |
| 8,015,906 | B2* | 9/2011 | Ito ......................... | B60R 21/239 89/1.14 |
| 8,500,166 | B2* | 8/2013 | Inuzuka ............. | B60R 21/2338 280/743.2 |

(Continued)

FOREIGN PATENT DOCUMENTS

| | | |
|---|---|---|
| JP | 2007-315533 A | 12/2007 |
| JP | 2009-090965 A | 4/2009 |

(Continued)

*Primary Examiner* — Faye M Fleming
(74) *Attorney, Agent, or Firm* — Posz Law Group, PLC (57) ABSTRACT

An airbag device includes an airbag, a connecting member extending from the airbag, and an actuator mounted on an airbag housing for controlling an inflation manner of the airbag. The actuator includes an actuator body that includes an operating pin which penetrates the connecting member, a mounting plate that holds the actuator body and is secured to the airbag housing, and a supporting plate that is disposed in a vicinity of a leading end portion of the operating pin. The supporting plate includes a supporting hole for receiving the operating pin, and a flange that is formed in a part of a periphery of the supporting hole toward which the connecting member is released. The flange extends along an axial direction of the operating pin towards the leading end of the operating pin for supporting the leading end portion of the operating pin with its surface facing the operating pin.

5 Claims, 9 Drawing Sheets

(56) References Cited

U.S. PATENT DOCUMENTS 8,678,432 B1 * 3/2014 Quioc ................ B60R 21/2338
                                                                       280/743.2
2009/0301339 A1     12/2009   Ito et al.

FOREIGN PATENT DOCUMENTS

| | | |
|---|---|---|
| JP | 2009-293785 A | 12/2009 |
| WO | WO-2008155954 A1 * | 12/2008 ......... B60R 21/2338 |

* cited by examiner

Fig. 10B

AIRBAG DEVICE

CROSS REFERENCE TO RELATED APPLICATIONS

The Present application claims priority from Japanese Patent Application No. 2018-163650 of Hiraiwa et al., filed on Aug. 31, 2018, the entire disclosure of which is incorporated herein by reference.

BACKGROUND OF THE INVENTION

1. Field of the Invention

The present invention relates to an airbag device for a vehicle, more particularly, relates to an airbag device which is provided with an actuator for controlling an inflation manner of the airbag.

2. Description of Related Art

There are some cases where an actuator is used for controlling an inflation manner of an airbag in an airbag device for a vehicle. By way of example, JP 2009-90965 A discloses such an actuator. The actuator includes an actuator body which includes an operating pin that penetrates and thus retains a connecting member extending from the airbag, and a supporting plate which supports a leading end of the operating pin. The actuator body includes a piston which is provided with the operating pin and a cylinder case which holds the piston such that the operating pin protrudes therefrom. The actuator is mounted on a vehicle in such a state that the operating pin penetrates the connecting member and brought into abutment against the supporting plate on the leading end. The actuator as actuated is configured to retract the operating pin such that the connecting member is disengaged from the operating pin. Accordingly, in the airbag device equipped with this actuator, if the actuator is not actuated, the airbag is inflated with the connecting member kept retained by the operating pin, and if the actuator is actuated, the airbag is inflated with the connecting member disengaged from the operating pin.

However, in the airbag device equipped with the above conventional actuator, there was a certain possibility that the actuator does not operate in a desired fashion, especially when the actuator is actuated in such a stage of airbag deployment that the airbag has been inflated to some extent and a certain tension has occurred in the connecting member. In such an instance, the operating pin is pulled by the connecting member and may tilt with respect to the cylinder case, which can result in a failure of retraction of the operating pin.

SUMMARY OF THE INVENTION

An object of the present invention is to provide an airbag device in which an actuator operates in a desired fashion even when the activation timing is changed.

The airbag device of the invention includes an airbag that is folded and is configured to unfold and be inflated with an inflation gas for protecting a vehicle occupant, a housing that houses the airbag, a connecting member that extends from the airbag, and an actuator that is mounted on the housing and coupled with the connecting member. The actuator is configured to either stay coupled with or be disengaged from the connecting member for controlling an inflation manner of the airbag.

The actuator includes:
an actuator body that includes an operating pin which penetrates and thus is coupled with the connecting member as the airbag device is mounted on the vehicle, and that is configured to retract the operating pin and release the connecting member when actuated;
a mounting plate that holds the actuator body and is secured to the housing; and
a supporting plate that is secured to the housing in a vicinity of a leading end portion of the operating pin and is disposed opposite to a peripheral portion that is disposed in a periphery of the operating pin such that the connecting member as coupled with the operating pin is disposed between the supporting plate and the peripheral portion.

The supporting plate includes a supporting hole for receiving the operating pin, and a flange that is formed in a part of a periphery of the supporting hole toward which the connecting member is to be released. The flange extends along an axial direction of the operating pin towards the leading end portion of the operating pin as passing through the supporting hole for supporting the leading end portion of the operating pin with its surface facing towards the operating pin.

In the airbag device of the invention, the actuator is configured such that the leading end portion of the operating pin is supported by the surface of the flange facing towards the operating pin, namely, by a supporting surface, on the part towards which the connecting member is to be released. The flange continues from the periphery of the supporting hole and extends along the axial direction of the operating pin towards the leading end of the operating pin as passing through the supporting hole. With this configuration, even if the operating pin is pulled by the connecting member and tilts so that the leading end faces towards the direction towards which the connecting member is to be released when the airbag is inflated to some extent and a certain tension occurs in the connecting member, the operating pin will abut against and be supported by the supporting surface and be prevented from severe deformation. That is, in the airbag device of the invention, although the operating pin may tilt due to the pulling force of the connecting member, the operating pin will be supported by the supporting surface of the flange which extends along the axial direction of the operating pin, thus will be adequately prevented from being so deformed as to dig into the periphery of the supporting hole of the supporting plate. Accordingly, even if actuated in such a stage of airbag deployment that the airbag has been inflated to some extent, the actuator body will be able to retract the operating pin smoothly and control the inflation manner of the airbag adequately.

Therefore, in the airbag device of the invention, the actuator will operate in a desired fashion even when the activation timing is changed.

In the airbag device of the invention, deformation of the operating pin will be further prevented if the operating pin is solid in its entirely from a root portion to the leading end portion which passes through the supporting hole.

In the airbag device of the invention, it is desired that the mounting plate includes:
a mounting tongue that is disposed in proximity to the supporting plate and secured to the housing;
a holding plate that is formed generally perpendicularly to the mounting tongue and holds the actuator body, the holding plate including a through hole which the operating pin goes through, and a peripheral portion of the through hole that is fixed to the actuator body such that the holding plate holds the actuator body;

a connecting portion that couples the mounting tongue and the holding plate together and is formed in such a manner as to circumvent the connecting member of the airbag; and an extended tongue that is formed in an edge of the holding plate facing towards the housing, and that extends generally in parallel to the mounting tongue towards a direction away from the mounting tongue in such a manner that a gap is formed between the housing and the extended tongue.

This configuration will prevent an abnormal noise during driving since the gap is disposed between the housing and the holding plate which holds the actuator body and a vibration of the holding plate does not propagate to the housing. Moreover, since the holding plate is provided with the extended tongue in the edge facing towards the housing, even if the connecting member pulls the operating pin and that causes a deformation of the holding plate, the extended tongue will abut against the housing such that the holding plate secures a reaction force, thus a further deformation of the holding plate will be prevented.

Furthermore, if the supporting plate and the mounting tongue of the mounting plate are fastened together to the housing, mounting of the mounting tongue and the supporting plate on the housing can be done effectively with the use of a single fixing member.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 2:
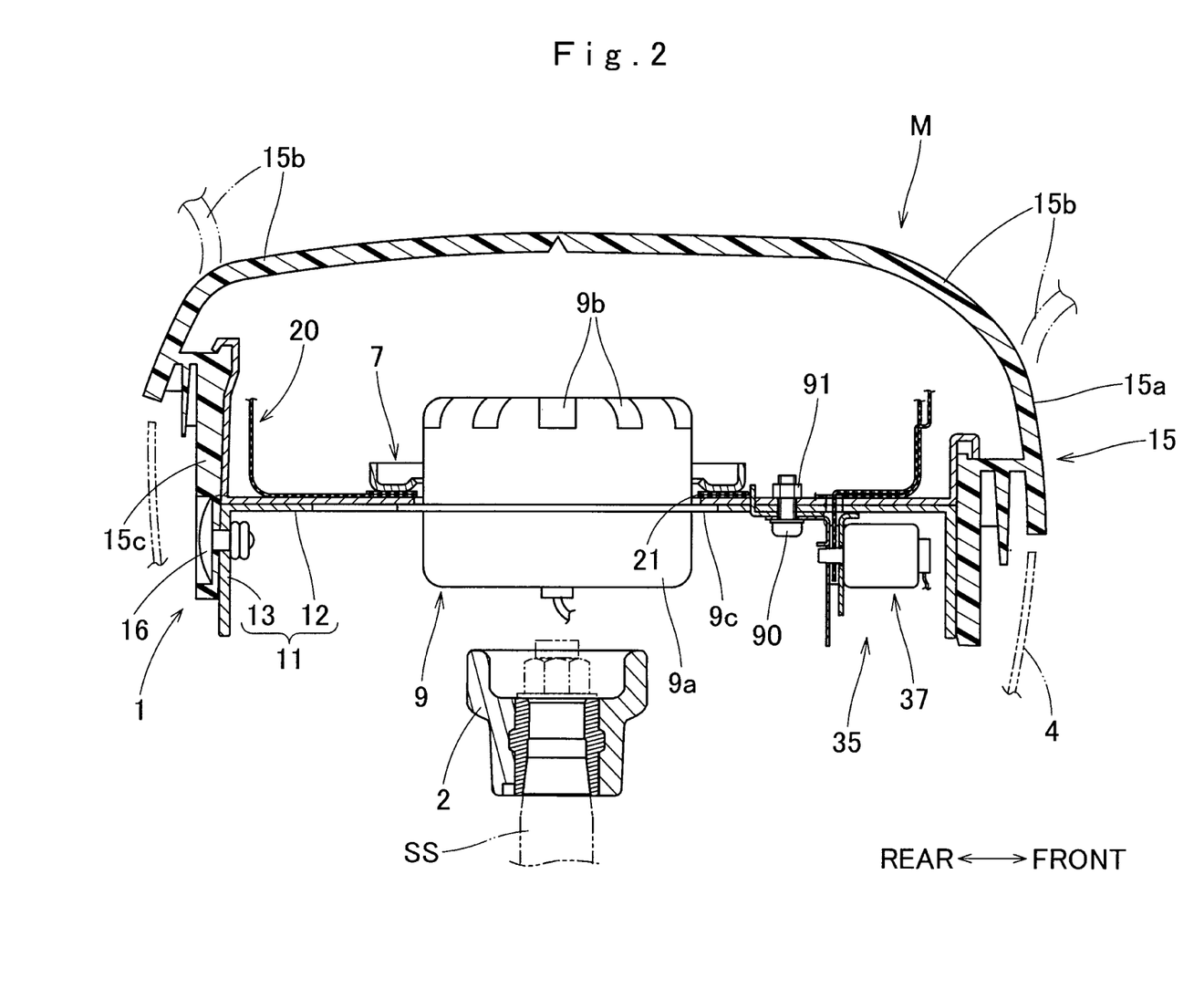
FIG. 2 is a vertical sectional view of the airbag device of FIG. 1.

The preferred embodiment of the invention is described herein as embodied into an airbag device M mountable on a steering wheel W. As shown in FIG. 2, the steering wheel W includes a wheel body 1 and the airbag device M. The wheel body 1 of the illustrated embodiment includes a rim R which is gripped with hands for steering, a boss B which is disposed generally at the center of the rim R and secured to a steering shaft SS, and a not-shown predetermined number of spokes which interconnect the rim R and the boss B. The airbag device M is mounted on the boss B of the wheel body 1.

Unless otherwise specified, front and rear, up and down, and left and right directions in this specification are intended to refer to those of a vehicle viewed from the steering wheel mounted on board and steered straight ahead. That is, the up and down direction refers to an up and down direction extending along an axial direction of the steering shaft SS, the front and rear direction refers to a front and rear direction of the vehicle orthogonal to the axial direction of the steering shaft SS, and the left and right direction refers to a left and right direction of the vehicle orthogonal to the axial direction of the steering shaft SS.

The wheel body 1 includes a core 2 which is formed from such metal as aluminum alloy and has such a contour that the rim R, the boss B and the spokes S are interconnected, a cladding layer 3 which is formed from synthetic resin and covers the core 2 on the rim R and a part of each of the spokes (not shown), and a lower cover 4 which is formed from synthetic resin and covers an underside of the boss B.

As shown in FIG. 2, the airbag device M includes an airbag 20 which is folded up, an inflator 9 for supplying the airbag 20 with an inflation gas, a case or a housing 11 which houses and holds the airbag 20 and inflator 9, an airbag cover 15 which covers the airbag 20, a retainer 7 which is used to mount the airbag 20 and inflator 9 on the case 11, and an actuator 35 which controls an inflation manner of the airbag 20. In the airbag device M of the illustrated embodiment, the inflator 9 and actuator 35 (more particularly, a later-described body 37 of the actuator 35) are configured to be actuated under control of a control device 95 depicted in FIG. 1.

Figure 1:
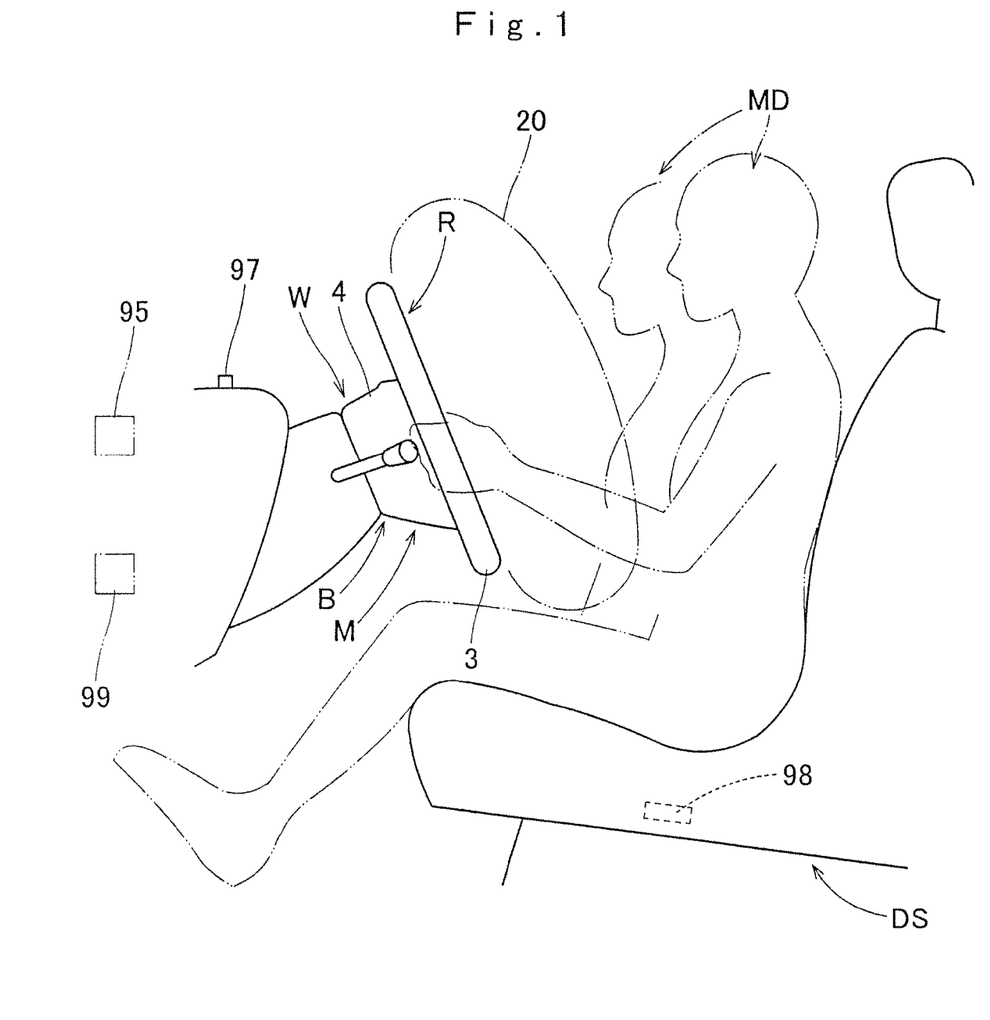
FIG. 1 is a schematic illustration of an airbag device for a steering wheel which airbag device embodies the invention.

As shown in FIG. 1, the control device 95 is electrically connected with a position sensor 97 for sensing a distance between the steering wheel W and a driver (as a vehicle occupant) MD and a weight sensor 98 for sensing the weight of the driver MD, which sensors are each a kind of an occupant sensor for detecting a physical size and/or a sitting position of the driver or occupant MD sitting in the driver's seat DS. The control device 95 is electrically connected also with a collision sensor 99 for detecting an acceleration of the vehicle and a direction of acceleration. The control device 95 actuates the inflator 9 as well as the body 37 of the actuator 35 in response to an electric signal fed from the position sensor 97, weight sensor 98, or collision sensor 99. In the illustrated embodiment, under control of the control device 95, the body 37 of the actuator 35 is configured to so operate as to control an internal pressure of the airbag 20 such that the airbag 20 is inflated in a preferable inflated mode when the inflator 9 is actuated and inflates the airbag 20. More specifically, the actuator 35 is configured to operate such that an extra inflation gas is exhausted from the airbag 20.

As shown in FIG. 2, the inflator 9 includes a body 9a which has a generally pot-like contour and is provided with a plurality of gas discharge ports 9b, and a flange 9c which is used to mount the inflator 9 on the case 11. The flange 9c is provided with a plurality of not-shown through holes for receiving bolts 7a of the retainer 7. The inflator 9 is electrically connected with the control device 95.

Figure 4:
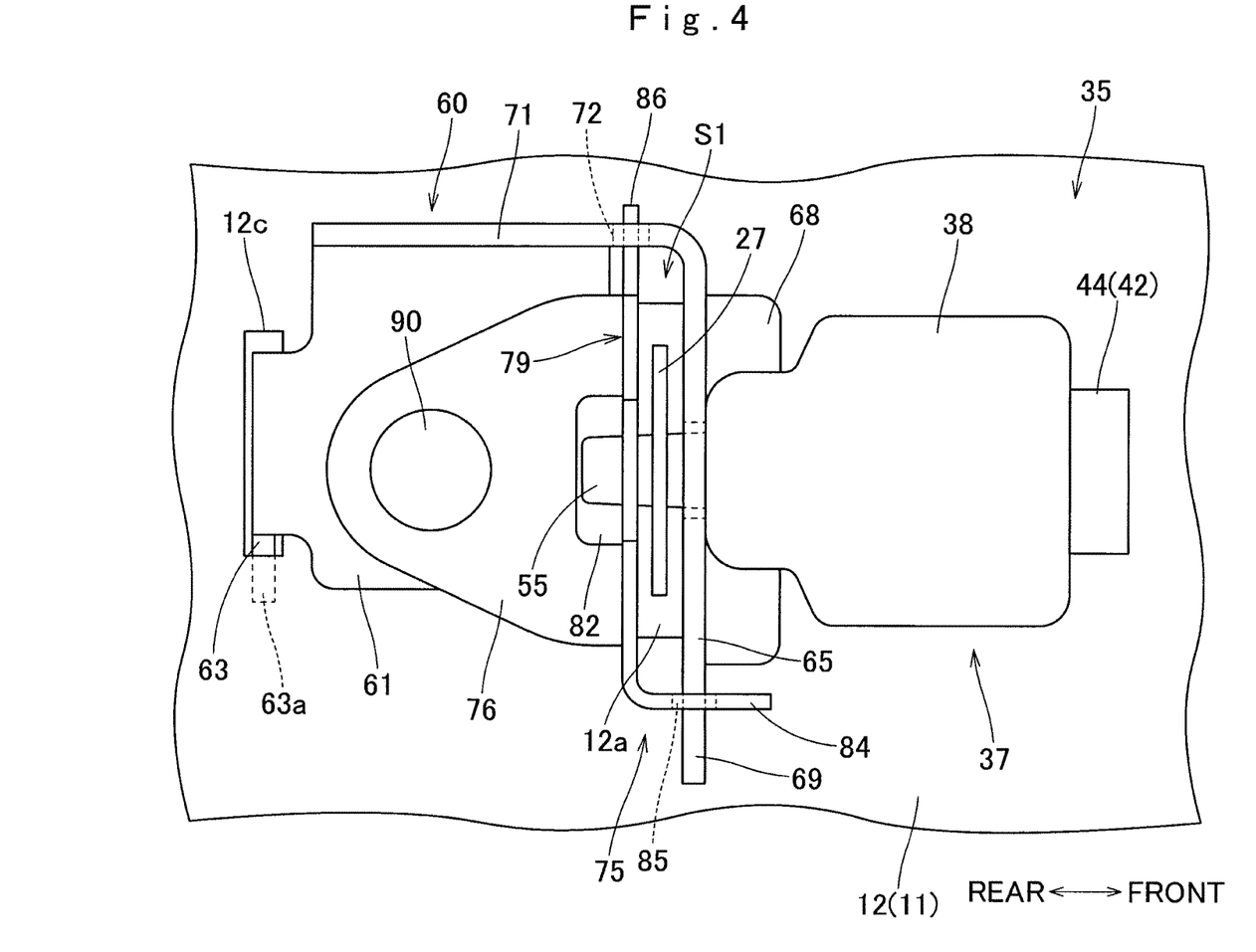
FIG. 4 is a partial enlarged bottom view of the airbag device of FIG. 2 showing the actuator.
Figure 5:
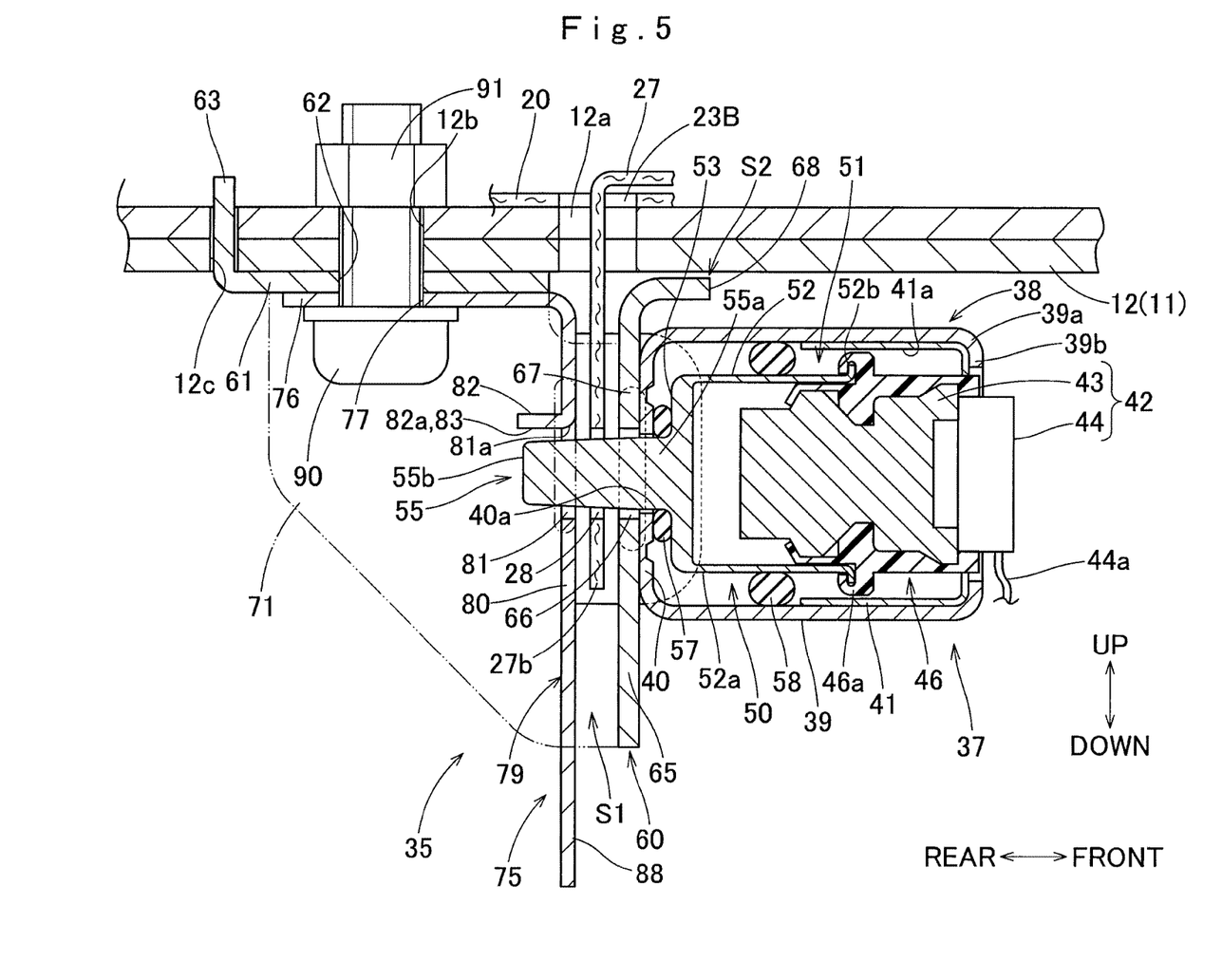
FIG. 5 is a vertical sectional view of the actuator of FIG. 4.

The case as the housing 11 is made of sheet metal, and includes a bottom wall 12 of a generally rectangular plate shape and a circumferential wall 13 extending upward from an outer edge of the bottom wall 12. The bottom wall 12 includes an opening (reference numeral omitted) for receiving the body 9a of the inflator 9 from below. Referring to FIGS. 4 and 5, the bottom wall 12 is further provided, in a portion in front of the opening for receiving the inflator body 9a, with a slot 12a for receiving a later-described belt (as a connecting member) 27 extending from the airbag 20, a mounting hole 12b for receiving a later-described bolt (as a fixing member) 9 which is used to fasten a later-described mounting plate 60 and supporting plate 75 of the actuator 35 to the bottom wall 12, and a through hole 12c for receiving a projecting tongue 63 formed in a later-described mounting tongue 61 of the mounting plate 60. The circumferential wall 13 includes, at the top, a not-shown mounting tongue which extends outwardly, and a mounting base of a horn switch mechanism is attached to the not-shown mounting tongue. The airbag device M of the illustrated embodiment is mounted on the boss B of the steering wheel body 1 as has been mounted on the steering shaft SS by securing the case 11 to the core 2 of the steering wheel W with the aid of the mounting base of the horn switch mechanism. Further, as shown in FIG. 2, a side wall 15c of the airbag cover 15 is attached to the circumferential wall 13 of the case 11 with the use of rivets 16 or the like. In the illustrated embodiment, the airbag 20 and inflator 9 are mounted on the case 11 through the use of the bolts 7a of the retainer 7 which serve as mounting members. More particularly, the retainer 7 is placed inside the airbag 20 such that the bolts 7a go through a periphery of an inlet opening 21 of the airbag 20, the bottom wall 12 of the case 11, and the flange 9c of the inflator 9, then the bolts 9a are nut 8 fastened. Thus the airbag 20 and inflator 9 are mounted on the case 11.

The airbag cover 15 is made from synthetic resin, and includes a ceiling wall 15a which covers the airbag 20 stored in the case 11 from above, and a side wall 15c which extends downwardly from a vicinity of an outer edge of the ceiling wall 15a in the shape of a generally square tube. The ceiling wall 15a includes two doors 15b which are openeable towards the front and rear when pushed by the airbag 20.

Figure 9:
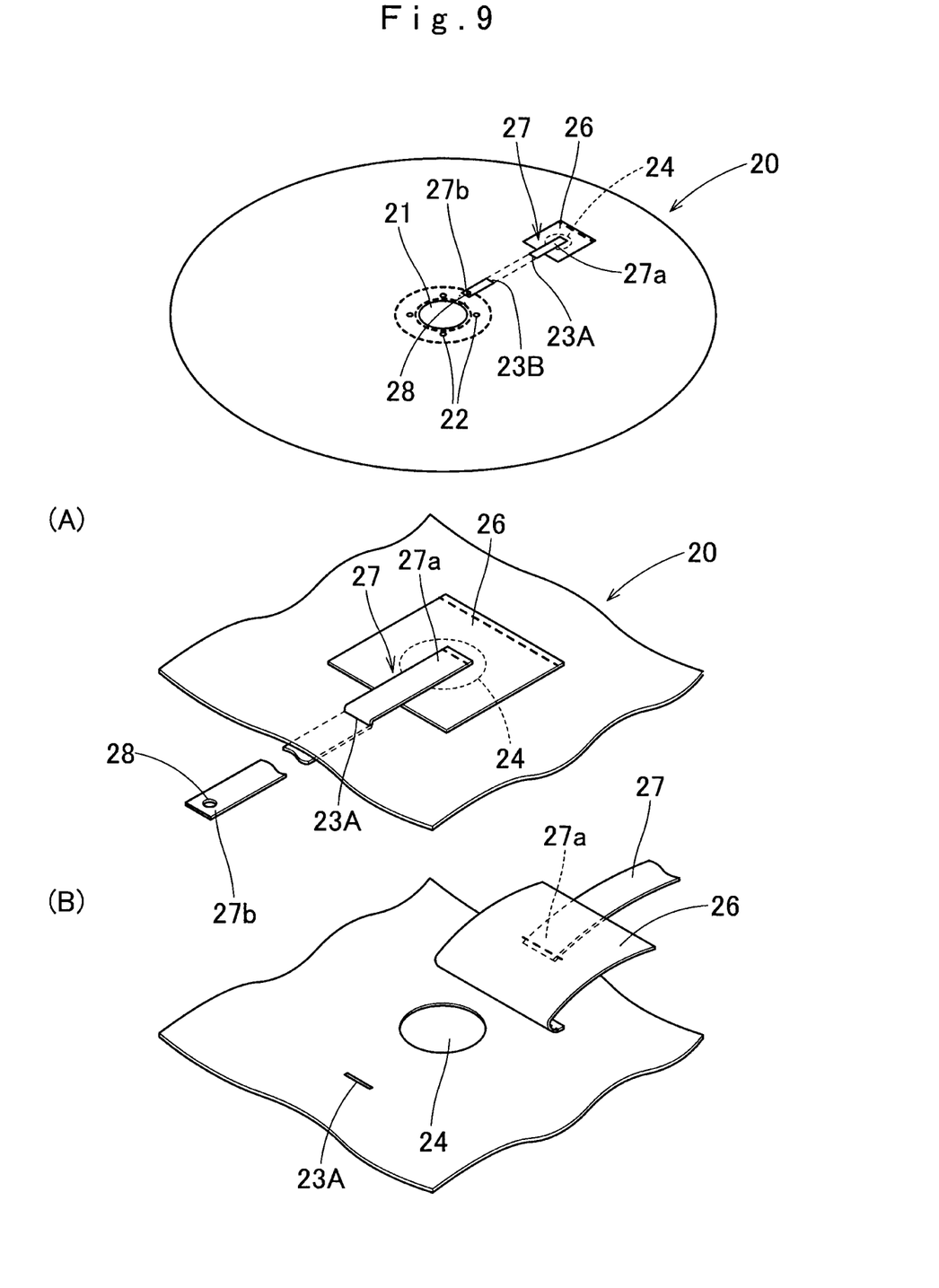
FIG. 9 is a schematic illustration showing an airbag of the airbag device of FIG. 2 and a region around an exhaust hole of the airbag.

The airbag 20 is formed of a flexible woven fabric of polyamide, polyester, or the like, and is so inflatable as to cover an upper surface of the steering wheel W when fed with an inflation gas, as indicated with double-dotted lines in FIG. 1. As shown in FIG. 9, the airbag 20 includes an inlet opening 21 for receiving the inflator body 9a from below. A plurality of mounting holes 22 are formed in a periphery of the inlet port 21 for receiving the bolts 7a of the retainer 7. Moreover, the airbag 20 includes a round exhaust hole 24 in a front area of the inlet port 21. Between the inlet port 21 and exhaust hole 24, two slots 23A and 23B for receiving the belt 27 are disposed. The slot 23A is disposed proximate to the rear edge of the exhaust hole 24, and the slot 23B is disposed proximate to the front edge of the inlet port 21. Each of the slots 23A and 23B is formed to extend in a left and right direction so as to allow the belt 27 to go there through.

Referring to FIG. 9, a flap 26 which lids the exhaust hole 24 is disposed on an outer surface of the airbag 20. The flap 26 is formed of a flexible woven fabric of polyamide, polyester, or the like, similarly to the airbag 20, and has such a generally rectangular shape as to be able to close the exhaust hole 24. The flap 26 is joined to a vicinity of the front edge of the exhaust hole 24 by its side facing away from the inlet port 21 (i.e. by the front side), and a root portion 27a of the belt (i.e. connecting member) 27 is joined to an opposite side of the flap 26 facing towards the inlet port 21 (i.e. to the rear side). The belt 27, which serves as a connecting member, is formed of a band-shaped member having flexibility, and is arranged generally along a front and rear direction on the airbag 20 as flatly developed. The belt 27 includes, at the leading end 27b portion, a through hole 28 for receiving a later-described operating pin 55 of the actuator body 37. The length of the belt 27 is so determined as to allow the airbag 20 to be inflated smoothly as the belt 27 stays coupled with the actuator body 37. The airbag 20 of the illustrated embodiment is folded up with the flap 26 covering the exhaust hole 24 on the outer surface of the airbag 20, and with the belt 27 let through the slots 23A and 23B such that the root portion 27a and leading end 27b portion are disposed on the outer surface of the airbag 20 while an intermediate portion on an inner surface of the airbag 20. The airbag 20 thus folded up is stored in the case 11. When the airbag device M is mounted on board, the leading end 27b of the belt 27 is put through the slot 12a of the case 11 and connected to the actuator body 37 by insertion of the operating pin 55 into the through hole 28.

The airbag 20 of the illustrated embodiment is configured to be inflated either in an open mode in which the exhaust hole 24 is open or in a closed mode in which the exhaust hole 24 is closed. More particularly, if the actuator body 37 is not actuated and keeps anchoring the leading end 27b of the belt 27 (in other words, if the operating pin 55 stays in the through hole 28 of the belt 27), the airbag 20 is inflated in the closed mode in which a leading end region of the flap 26 is held down by the root portion 27a of the belt 27 and keeps closing the exhaust hole 24, as shown in FIG. 9A. If the actuator body 37 is actuated and retracts the operating pin 55 such that the pin 55 is removed from the through hole 28 and stops anchoring the belt 27, the airbag 20 is inflated in the open mode in which the flap 26 flips up due to an inflation gas going out of the exhaust hole 24, and thereby the exhaust hole 24 is open, as shown in FIG. 9B. The airbag 20 completes inflation with a maintained internal pressure in the closed mode, while with a suppressed internal pressure in the open mode. The operation of the actuator body 37 is controlled by the control device 95. In the illustrated embodiment, the control device 95 actuates the actuator body 37 either at the same time as the inflator 9 or slightly after actuating the inflator 9 in order to suppress the internal pressure of the airbag 20, when the control device 95 determines an undue proximity of the driver MD to the steering wheel W based on a signal received from the position sensor 97, or when the control device 95 senses that the driver MD is of small build based on a signal received from the weight sensor 98.

Figure 3:
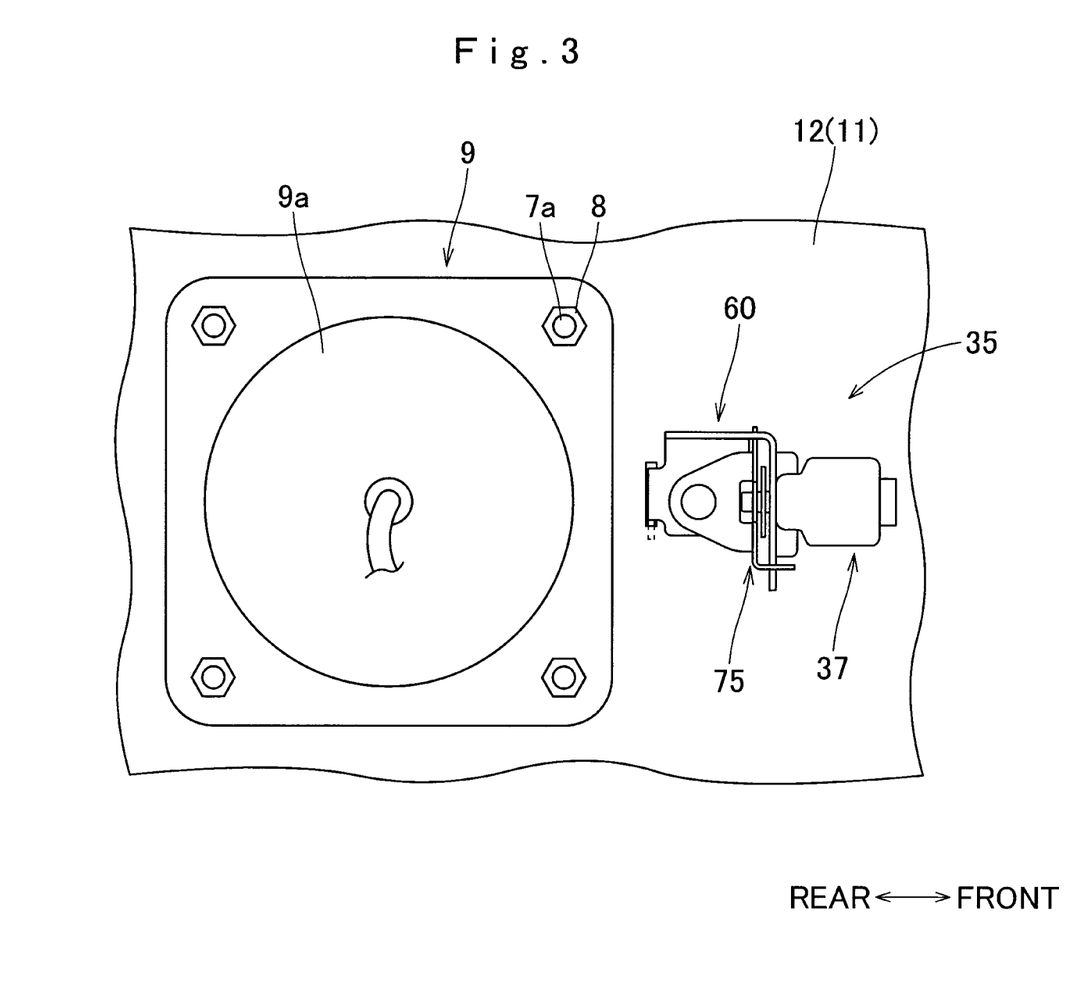
FIG. 3 is a partial enlarged bottom view of the airbag device of FIG. 2 showing an inflator and an actuator.
Figure 6:
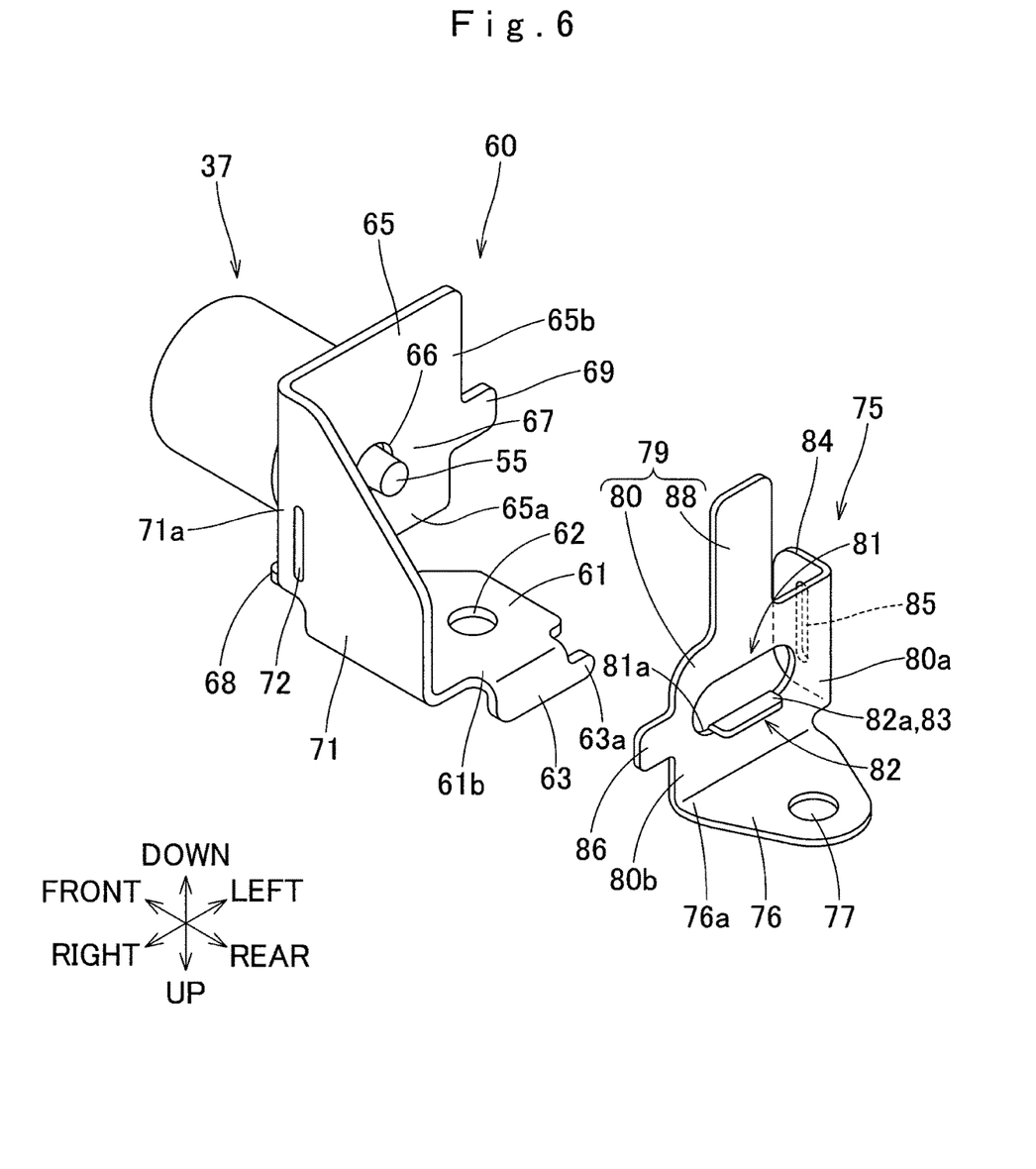
FIG. 6 is a schematic exploded perspective view of the actuator of FIG. 4.

As shown in FIGS. 2 and 3, the actuator 35 is disposed in front of the inflator 9. As shown in FIGS. 4 to 6, the actuator 35 includes an actuator body 37, a mounting plate 60 which holds the actuator body 37, and a supporting plate 75 which is disposed in a vicinity of a leading end 55b of the operating pin 55 of the actuator body 37.

As shown in FIG. 5, the actuator body 37 includes a piston 50 which is provided with the operating pin 50, a gas generator 42 which is ignited when actuated and generates a driving gas G, and a cylinder case 38 which holds the piston 50. The piston 50 and gas generator 42 are made integral through the intermediary of a holder 46. The operating pin 55 of the piston 50 is configured to move along an axial direction of the cylinder case 38, more particularly, to retract into the cylinder case 38, when the actuator body 37 is actuated.

Figure 10A:
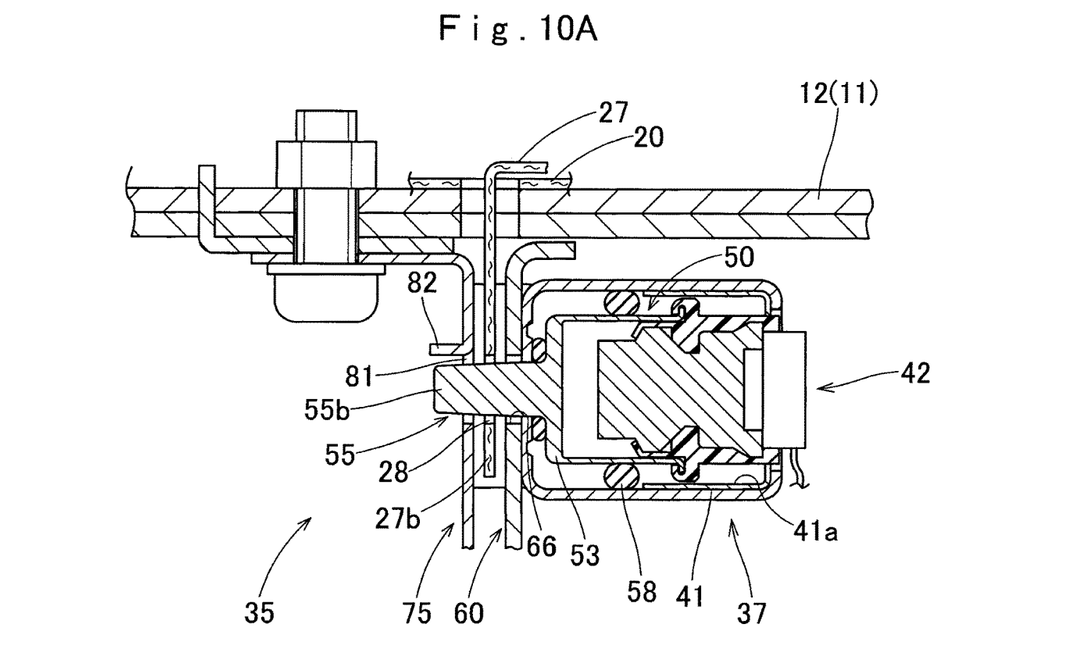
FIG. 10A is a vertical sectional view of the actuator of FIG. 4 before operation.
Figure 10B:
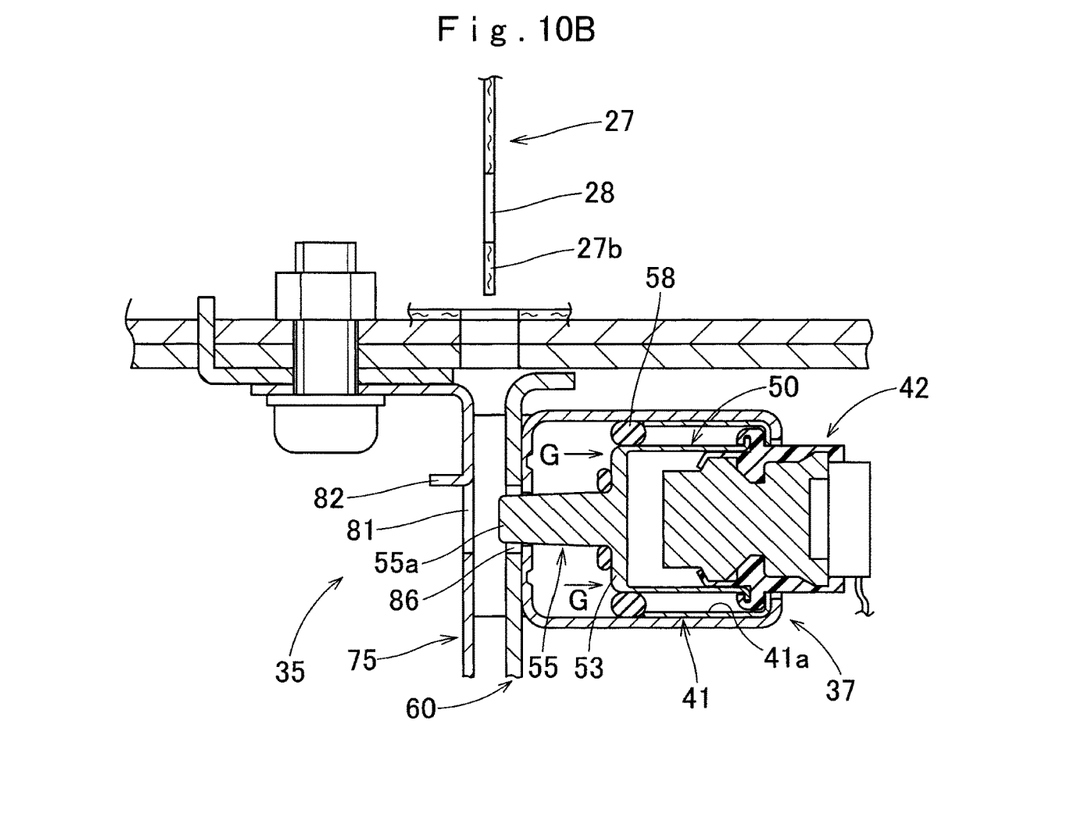
FIG. 10B is a vertical sectional view of the actuator of FIG. 4 after operation.

The cylinder case 38 is made of sheet metal, and includes a circumferential wall 39 which is cylindrical in contour and surrounds the piston 50, and a ceiling wall 40 which is generally circular in contour and closes the leading end of the circumferential wall 39. The circumferential wall 39 is so disposed that the axial direction extends along a front and rear direction. At the center of the ceiling wall 40 is a generally round opening 40a for allowing the operating pin 55 to protrude therefrom. In the illustrated embodiment, a regulating ring 41, which is generally cylindrical in contour, is disposed inside the cylinder case 38 in such a manner as to cover an inner circumference of the circumferential wall 39. The regulating ring 41 is placed at a region of the circumferential wall 39 distant from the ceiling wall 40 in order to prevent a later-described sealing ring 58 from moving on with the piston 50 (see FIGS. 10A and 10B) when the actuator body 37 is actuated. Further, in the illustrated embodiment, a later-described large-diameter portion 46a of the holder 46 slides on an inner circumferential plane 41a of the regulating ring 41 when the piston 50 retracts. A region in a periphery of the opening 40a of the ceiling wall 40 in the cylinder case 38 is secured to a later-described holding plate 65 of the mounting plate 60 as shown in FIG. 5, thereby the actuator body 37 is held by the mounting plate 60. A root portion (or front end portion) of the circumferential wall 39 of the cylinder case 38 is open so as to expose a later-described connector 44 of the gas generator 42 therefrom, and a stopper 39b, which prevents the piston 50 as retracting from being disengaged from the cylinder case 38, is provided in an entire root end 39a of the circumferential wall 39 (i.e. in an entire edge of the opening) in an inwardly bending manner. The piston 50 as retracting is prevented from being disengaged from the cylinder case 38 because the large-diameter portion 46a of the holder 46 abuts against the stopper 39b, as shown in FIG. 10B. In a production process of the actuator body 37 of the illustrated embodiment, the stopper 39b is formed by swaging or plastically deforming the root end 39a of the circumferential wall 39 of the cylinder case 38 after the piston 50 integral with the gas generator 42 was stored inside the cylinder case 38.

The gas generator 42 is composed of a squib or a micro gas generator which, in response to an actuating signal fed from the control device 95, ignites not-shown predetermined gunpowder and generates a driving gas G by combustion of the gunpowder itself or by combustion of a gas generating agent fired by the ignited gunpowder. The gas generator 42 includes a main body 43 which is held by the holder 46 and generates a driving gas, and a connector 44 which protrudes from the holder 46 and is connected with the control device 95 with a lead wire 44a.

The piston 50 includes a cap portion 51 which covers the main body 43 of the gas generator 42, and an operating pin 55 which protrudes rearward from the cap portion 51. A sealing ring 57 is disposed around a root portion 55a of the operating pin 55, as described later in detail. The holder 46 holding the gas generator 42 is generally cylindrical in outer contour and includes, at the leading end (i.e. rear end), a large-diameter portion 46a. As described above, the large-diameter portion 46a slides on the inner circumferential plane 41a of the regulating ring 41 when the piston 50 retracts.

The cap portion 51 is formed generally into a hollow cylinder extending generally along an axial direction of the cylinder case 38 (i.e. along the front and rear direction) so as to surround the gas generator 42. More specifically, the cap portion 51 includes a tubular side wall 52 which covers the main body 43 of the gas generator 42, and an end wall 53 which closes off a leading end (rear end) 52a of the side wall 52. A root end (front end) 52b portion of the side wall 52 and the large-diameter portion 46a of the holder 46 are swaged together, such that the cap portion 51 is integral with the holder 46, i.e. the piston 50 is integral with the gas generator 42. Further, the end wall 53 of the cap portion 51 includes, at a farther outward position than the location of the later-described sealing ring 57 (FIG. 5), a not-shown ejection hole for releasing the driving gas G discharged from the gas generator 42 into the cylinder case 38.

The operating pin 55 protrudes rearward along the axial direction of the cylinder case 38 (i.e. along the front and rear direction) generally from the center of the end wall 53 of the cap portion 51. In the illustrated embodiment, the operating pin 55 is formed generally into a rod which slightly tapers towards the leading end 55b. The operating pin 55 is solid as a whole from the root portion 55a to the leading end 55b. The length of the operating pin 55 is such that the leading end 55b protrudes a little from the ceiling wall 40 of the cylinder case 38 when the large-diameter portion 46a of the holder 46 abuts against the stopper 39b of the cylinder case 38 at completion of retraction of the piston 50.

As described above, a generally annular sealing ring 57 composed of a rubber-like elastic body is put on the root portion 55a of the operating pin 55 for securing airtightness of the cylinder case 38. As shown in FIG. 5, the sealing ring 57 closes off a gap formed between the operating pin 55 and the opening 40a of the ceiling wall 40 of the cylinder case 38 from the interior when the actuator body 37 is in a standby state, and also infills a void between the ceiling wall 40 and the end wall 53. The sealing ring 57 moves along the operating pin 55 when the piston 50 retracts, as shown in FIG. 10B.

In the actuator body 37 of the illustrated embodiment, another sealing ring (O ring) 58 composed of a rubber-like elastic body is disposed around the side wall 52 of the cap portion 51 of the piston 50 for securing airtightness of the cylinder case 38. The sealing ring 58 fills in a void between the side wall 52 of the cap portion 51 and the circumferential wall 39 of the cylinder case 38 in order to secure airtightness between the piston 50 and circumferential wall 39. As described above, the sealing ring 58 is stopped from moving by the regulating ring 41 when the piston 50 retracts (see FIG. 10B).

The mounting plate 60 holds the actuator body 37 and is mounted on the case 11. As shown in FIGS. 5 to 8, the mounting plate 60 includes a mounting tongue 61 mounted on the case 11, a holding plate 65 which is formed generally perpendicularly to the mounting tongue 61 and holds the actuator body 37, and a connecting portion 71 which couples the mounting tongue 61 and holding plate 65 together.

The mounting tongue 61 is formed into a generally rectangular plate so as to extend along the bottom wall 12 of the case 11, and is provided with a mounting hole 62 for receiving a bolt (as a fixing member) 90 which secures the mounting tongue 61 to the bottom wall 12. In the illustrated embodiment, as shown in FIG. 5, the mounting tongue 61 is fastened to the bottom wall 12 of the case 11 together with a later-described mounting tongue 76 of the supporting plate 75 with the bolt 90 and a nut 91. The mounting tongue 61 includes, in its edge disposed apart from the holding plate 65 (in the rear edge 61b, in the illustrated embodiment), a projecting tongue 63 which protrudes upward, i.e. towards the case 11, to be inserted through the through hole 12c of the case 11. The projecting tongue 63 protrudes not only upward but also towards the left. A left end portion 63a, the portion protruding towards the left, is retained by a peripheral portion of the through hole 12c on an upper surface of the bottom wall 12 of the case 11 when the projecting tongue 63 is set in the through hole 12c of the case 11, as shown in FIGS. 4 and 5. The projecting tongue 63 prevents the mounting tongue 61 from turning when the mounting tongue 61 and the mounting tongue 76 of the supporting plate 75 are fastened together to the bottom wall 12 with the bolt 90.

Figure 8:
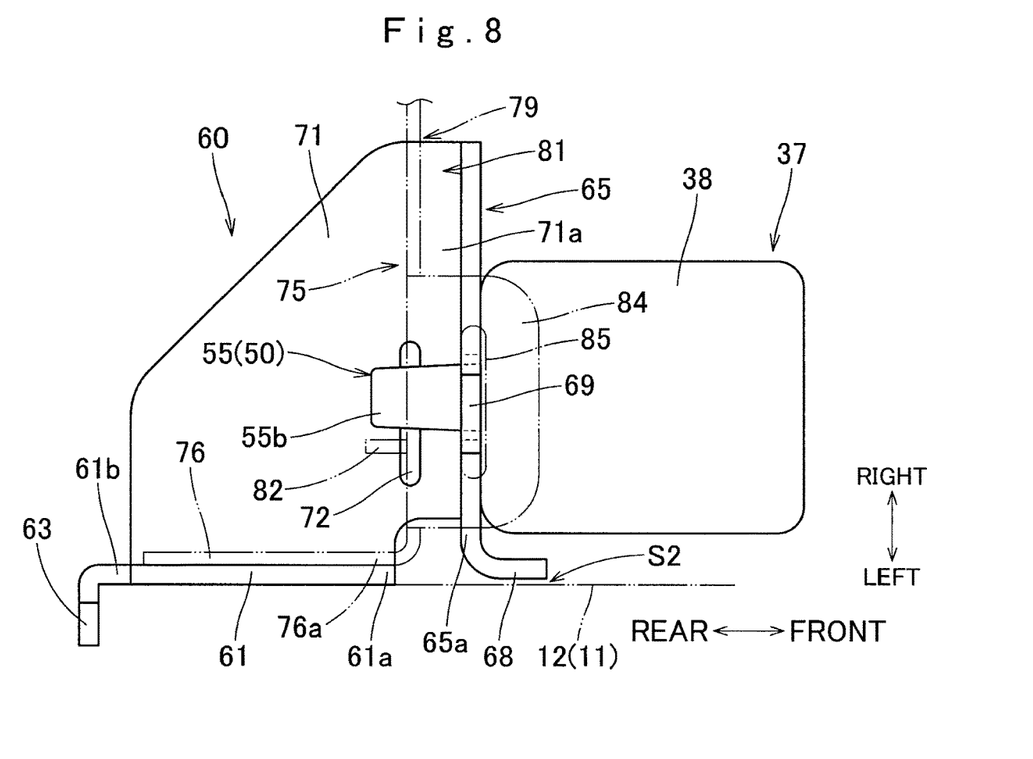
FIG. 8 is a side view of the actuator of FIG. 4 showing the actuator body and the mounting plate.

The holding plate 65 is formed into a generally rectangular plate extending generally along an up and down direction, i.e. generally perpendicularly to the mounting tongue 61 and generally perpendicularly to the bottom wall 12 of the case 11, as the mounting plate 60 is mounted on the case 11, as shown in FIGS. 5, 6 and 8. The holding plate 65 is provided with a round through hole 66 for receiving the operating pin 55, generally at the center. The holding plate 65 is fixed to the ceiling wall 40 of the cylinder case 38 in the actuator body 37 on a peripheral portion 67 of the through hole 66, thus holding the actuator body 37. The holding plate 65 as mounted on the case 11 is opposed to a later-described supporting body 79 of the supporting plate 75 in the front and rear direction, and a space S1 is disposed between the holding plate 65 and the supporting body 79. The leading end 27b portion of the belt 27 extending from the airbag 20 is disposed in the space S1, as shown in FIGS. 4 and 5. In the illustrated embodiment, the space S1 is in communication with the slot 12a formed in the bottom wall 12 of the case 11 for receiving the belt 27. The holding plate 65 is not directly continuous with the mounting tongue 61. An upper edge 65a of the holding plate 65 (i.e. an edge facing towards the case 11) is separated from the mounting tongue 61.

Figure 7:
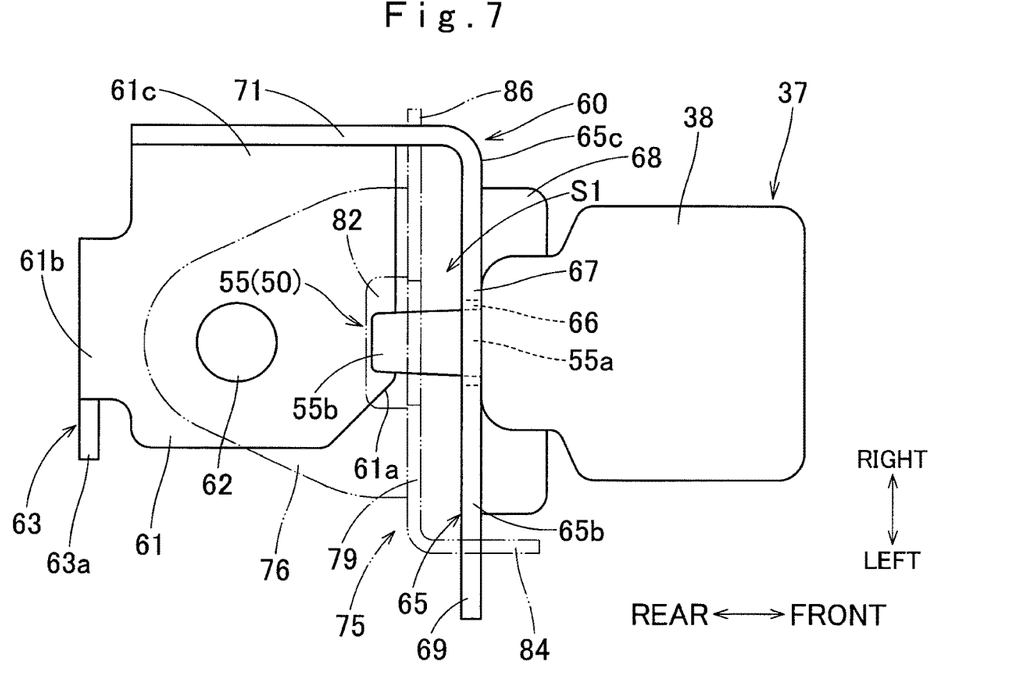
FIG. 7 is a bottom view of the actuator of FIG. 4 showing an actuator body and a mounting plate.

The upper edge 65a of the holding plate 65 is provided with an extended tongue 68 which extends generally in the same direction as the mounting tongue 61 (thus, generally in parallel to the bottom wall 12 of the case 11) and extends away from the mounting tongue 61 (i.e. forward) such that a gap S2 is formed between the bottom wall 12 and the extended tongue 68, as shown in FIG. 5. A size of the gap S2 is so determined as to prevent a contact between the extended tongue 68 and bottom wall 12 of the case 11 even when the holding plate 65 vibrates during driving of the vehicle or the like. In the illustrated embodiment, the extended tongue 68 is formed over an entire width in a left and right direction of the holding plate 65, as shown in FIG. 7. Further, the holding plate 65 is provided, in a vicinity of an upper end of the left edge 65b (i.e. the edge apart from the connecting portion 71), with a projecting tab 69 which protrudes towards the left. The projecting tab 69 is put through a slot 85 formed in a later-described bent tongue 84 of the supporting plate 75, as shown in FIG. 4.

As shown in FIGS. 6 to 8, the connecting portion 71 that connects the mounting tongue 61 and holding plate 65 is formed generally perpendicularly to each of the mounting tongue 61 and holding plate 65, and is disposed generally along the front and rear direction as mounted on board. The connecting portion 71 is formed in such a manner as to connect a right edge 61c of the mounting tongue 61 and a right edge 65c of the holding plate 65. The connecting portion 71 is formed into a generally trapezoidal plate which has an oblique side in the lower portion, and includes, in a vicinity of the front edge 71a, a slot 72 which extends generally along the up and down direction for receiving a later-described projecting tab 86 formed in a right edge 80b of the supporting body 79 in the supporting plate 75.

The supporting plate 75 is disposed in a vicinity of the leading end 55b of the operating pin 55 of the actuator body 37, and includes a supporting body 79 which is opposed to the holding plate 65 of the mounting plate 60 in the front and rear direction, and a mounting tongue 76 which is mounted on the case 11, as shown in FIG. 6.

As described above, the mounting tongue 76 is fastened to the bottom wall 12 of the case 11 together with the mounting tongue 61 of the mounting plate 61. The mounting tongue 76 is formed into such a generally triangular plate that extends along the bottom wall 12 and enlarges towards the front end, and has a mounting hole 77 for receiving the bolt 90 at a position corresponding to the mounting hole 62 of the mounting tongue 61. The mounting tongue 76 is placed under the mounting tongue 61 of the mounting plate 60 and secured to the bottom wall 12 together with the mounting tongue 61 with the bolt 90 and nut 91, as shown in FIGS. 4 and 5.

The supporting body 79 extends downwardly from a front edge 76a of the mounting tongue 76. The supporting body 79 is disposed generally perpendicularly to the mounting tongue 76 (i.e. generally perpendicularly to the bottom wall 12 of the case 11), and generally along the up and down direction, in parallel to the holding plate 65 of the mounting plate 60. The supporting body 79 is opposed, in the front and rear direction, to a peripheral portion which is disposed in a periphery of the operating pin 55, that is, to the peripheral portion 67 of the holding plate 65 of the mounting plate 65 in the illustrated embodiment. Moreover, as described above, the supporting body 79 is disposed at a distant from the holding plate 65 at the rear of the holding plate 65 such that the belt 27 extending from the airbag 20 is disposed in the space S1 formed between the holding plate 65 (specifically, the peripheral portion 67 of the through hole 66) and the supporting body 79. More particularly, the supporting body 79 includes an upper portion 80 which is disposed towards the mounting tongue 76 and has a generally same width in the left and right direction as a root portion (i.e. front edge 76a) of the mounting tongue 76, and a lower portion 88 which has a band-shape having a smaller width in the left and right direction than the upper portion 80. The lower portion 88 of the illustrated embodiment extends downwardly from a position to the right of the center in the left and right direction of the lower edge of the upper portion 80. In the illustrated embodiment, moreover, the lower end of the lower portion 88 as mounted on board is disposed farther downward than the lower edge of the holding plate 65, as shown in FIG. 5.

The upper portion 80 of the supporting body 79 is provided with a supporting hole 81 generally at a position opposed to the through hole 66 of the holding plate 65 in the front and rear direction. The supporting hole 81 is configured to support the leading end 55b portion of the operating pin 55 with an inner surface thereof, namely, a supporting surface 83. As shown in FIG. 6, the supporting hole 81 is formed generally into a long hole elongate in the left and right direction. The supporting hole 81 includes, in a part of the periphery towards which the belt 27 is thrown off (i.e. in the upper edge 81a), a flange 82 which extends rearward. That is, as shown in FIG. 5, the flange 82 extends along the axial direction of the operating pin 55 from the periphery of the supporting hole 81, towards the leading end 55b of the operating pin 55 as going through the supporting hole 81. The flange 82 is formed over a generally entire area in the left and right direction of the supporting hole 81, and its width in the left and right direction is slightly smaller than that of the supporting hole 81, as shown in FIG. 6. A rearward-protruding amount of the flange 82 is such that the leading end is located slightly farther rearward than the leading end 55b of the operating pin 55 as the actuator 35 is mounted on the case 11, as shown in FIG. 5. A lower surface 82*a* of the flange 82 which continues from the inner surface of the supporting hole 81 (i.e. a surface of the flange 82 facing towards the operating pin 55) constitutes the supporting surface 83 that supports the leading end 55*b* portion of the operating pin 55. The upper portion 80 further includes a bent tongue 84 which bends forward from the left edge 80*a*. The bent tongue 84 is provided with a slot 85 which extends generally along the up and down direction for receiving the projecting tab 69 formed in the left edge 65*b* of the holding plate 65 in the mounting plate 60. The upper portion 80 further includes a projecting tab 86 which partially protrudes towards the right in the right edge 80*b*. The projecting tab 86 is inserted through the slot 72 formed in the connecting portion 71 of the mounting plate 60, as shown in FIG. 4.

Mounting of the airbag device M on the vehicle is now described. Firstly, the airbag 20 is prepared such that the flap 26 is arranged to close the exhaust hole 24 and the belt 27 is put through the slots 23A and 23B such that the leading end 27*b* portion protrudes out of the slot 23B. Then the retainer 7 is placed inside the airbag 20, and the airbag 20 is folded such that the above-described arrangement of the flap 26 and belt 27 is maintained. The folded airbag 20 is then stored in the case 11. At this time, the leading end 27*b* portion of the belt 27 is put through the slot 12*a* of the bottom wall 12 of the case 11 to extend downwardly. Then the actuator 35 is mounted on the case 11. Specifically, the operating pin 55 of the actuator body 37 is put through the through hole 28 formed in the leading end 27*b* portion of the belt 27, and the mounting plate 60, which has been coupled with the actuator body 37 in advance, is placed under the bottom wall 12 of the case 11 such that the projecting tongue 63 fits in the through hole 12*c* of the bottom wall 12. Subsequently, the supporting plate 75 is assembled with the mounting plate 60 by putting the projecting tabs 69 and 86 into the slots 72 and 85, respectively, such that the leading end 27*b* portion of the belt 27 is disposed between the holding plate 65 of the mounting plate 60 and the supporting body 79 of the supporting plate 75, and the mounting tongue 76 of the supporting plate 75 is placed under the mounting tongue 61 of the mounting plate 60. Then the mounting tongues 61 and 76 are fastened to the bottom wall 12 of the case 11 with the bolt 90 and nut 91, thus the actuator body 37 is coupled with the belt (i.e. connecting member) 27, and the actuator 35 is mounted on the case 11. Thereafter, the inflator body 9*a* is set in the case 11 from below the bottom wall 12, and the inflator 9 and airbag 20 are mounted on the case 11 with the use of the bolts 7*a* of the retainer 7, which protrudes from the bottom wall 12, and nuts 8. Then the airbag cover 15 is placed over the case 11 and is mounted on the case 11 with the aid of rivets 16 or the like, and the not-shown horn switch mechanism is attached to the not-shown mounting tongue of the case 11. The airbag device M is thus assembled. The airbag device M is then mounted on the steering wheel body 1 which has been fastened to the steering shaft SS with the use of the not-shown mounting base of the horn switch mechanism. If then the connector 44 which has been connected to the control device 95 with the lead wire 4*a* is connected with the main body 43 of the gas generator 42, and another not-shown lead wire extending from the control device 95 is connected to the inflator 9, the airbag device M is mounted on the vehicle.

If the airbag device M is actuated and the inflator 9 discharges an inflation gas from the gas discharge ports 9*b*, the airbag 20 is inflated with the inflation gas, pushes open the doors 15*b* of the airbag cover 15, protrudes from the case 11, and is deployed over the steering wheel W, as indicated with double-dotted lines in FIG. 1. In the meantime, if the actuator 35 is actuated in response to an actuating signal from the control device 95 and the gas generator 42 of the actuator body 37 generates a driving gas G, the gas G belches out into the cylinder case 38 via the not-shown ejection holes. The gas G filled in the cylinder case 38 then pushes the end wall 53 of the piston 50 forward, such that the whole piston 50 moves forward along the axial direction of the cylinder case 38 due to the pushing force of the driving gas G, and the operating pin 55 retracts into the cylinder case 38. Then as shown in FIG. 10B, the operating pin 55 is pulled out of the through hole 28 of the belt 27, thus disengaged from the belt 27, such that the flap 26, which has been anchored by the belt 27, flips up and opens the exhaust hole 24 of the airbag 20 as shown in (B) of FIG. 9, and the inflation gas is exhausted from the exhaust hole 24.

In the airbag device M as mounted on the vehicle, the actuator 35 is configured such that an upper surface of the leading end 55*b* portion of the operating pin 55 (i.e. a portion of the leading end 55*b* portion on the part towards which the belt 27 is to be released) is supported by the supporting surface 83 formed in the supporting plate 75. The supporting surface 83 is composed of the lower surface 82*a* (i.e. the surface facing towards the operating pin 55) of the flange 82 which continues from the inner surface of the supporting hole 81 and extends along the axial direction of the operating pin 55 as going through the supporting hole 81 towards the leading end 55*b* of the operating pin 55. With this configuration, even if the operating pin 55 is pulled by the belt 27 and tilts so that the leading end 55*b* faces upward (i.e. towards the direction towards which the belt 27 is to be thrown off) when the airbag 20 is inflated to some extent and a certain tension occurs in the connecting member, the operating pin 55 will abut against the supporting surface 83 and be prevented from severe deformation. That is, in the airbag device M of the illustrated embodiment, although the operating pin 55 may tilt due to the pulling force of the belt 27, the supporting surface 83 of the flange 82 will support the operating pin 55, and will adequately prevent the operating pin 55 from being so deformed as to dig into not only the periphery of the supporting hole 81 of the supporting plate 75, but also the periphery of the through hole 66 of the mounting plate 60 and the periphery of the opening 40*a* of the ceiling wall 40 in the cylinder case 38, in the illustrated embodiment. Accordingly, even if actuated in such a stage of airbag deployment that the airbag 20 has been inflated to some extent, the actuator body 37 will be able to retract the operating pin 55 smoothly and the inflation manner of the airbag 20 will be controlled adequately.

Therefore, in the airbag device M of the illustrated embodiment, the actuator 35 will operate in a desired fashion even when the activation timing is changed.

In the airbag device M of the illustrated embodiment, the operating pin 55 is solid in its entirely from the root portion 55*a* to the leading end portion 55*b* which goes through the supporting hole 81. This configuration will further prevent the operating pin 55 from being deformed. If such an advantageous effect does not have to be considered, the operating pin may be hollow from the root portion to the leading end portion.

In the airbag device M of the illustrated embodiment, moreover, the mounting plate 60 includes the mounting tongue 61 that is disposed in proximity to the supporting plate 75 and fastened to the bottom wall 12 of the case 11, the holding plate 65 that is formed generally perpendicularly to the mounting tongue 61 and holds the actuator body 37

(specifically, the peripheral portion of the through hole 66 is fixed to the actuator body 37, i.e. to the ceiling wall 40 of the cylinder case 38, such that the holding plate 65 holds the actuator body 37), and the connecting portion 71 that couples the mounting tongue 61 and the holding plate 65 together and is formed in such a manner as to circumvent the belt 27. That is, in the illustrated embodiment, the holding plate 65 to which the actuator body 37 is fixed does not directly continue from the mounting tongue 61 which is fastened to the case 11, but is coupled with the mounting tongue 61 through the medium of the connecting portion 71 that is so formed as to allow the belt 27 pass through the mounting tongue 61 and holding plate 65. The mounting plate 60 further includes, in the edge (or upper edge 65a) of the holding plate 65 facing towards the case 11, the extended tongue 68 that extends generally in parallel to the mounting tongue 61 (in other words, generally in the same direction as the mounting tongue 61 extends) towards a direction away from the mounting tongue 61 (i.e. forward) in such a manner that the gap S2 is formed between the case 11 (or bottom wall 12) and the extended tongue 68. This configuration will prevent an abnormal noise during driving since the gap S2 is disposed between the case 11 (or bottom wall 12) and the holding plate 65 which holds the actuator body 37 and a vibration of the holding plate 65 will not propagate to the case 11. Moreover, since the holding plate 65 includes the extended tongue 68 in the edge facing towards the case 11 (i.e. in the upper edge 65a), even if the belt 27 pulls the operating pin 55 and that causes a deformation of the holding plate 65, the extended tongue 68 will abut against the bottom wall 12 of the case 11 such that the holding plate 65 secures a reaction force, thus a further deformation of the holding plate 65 will be prevented.

In the illustrated embodiment, the actuator body 37 is fixed to the holding plate 65 of the mounting plate 60, thus mounted on the case 11 through the medium of the mounting plate 60. However, the mounting manner of the actuator body on the case should not be limited thereby. By way of example, the actuator body may be mounted on the case through the use of a mounting bracket or the like separately from the supporting plate so as to be immediately opposed to the supporting plate. In such an instance, the ceiling wall of the cylinder case constitutes the peripheral portion which is disposed in the periphery of the operating pin.

Furthermore, in the airbag device M of the illustrated embodiment, the supporting plate 75 and the mounting plate 60 are fastened together to the bottom wall 12 of the case 11 through the use of a single fixing member (i.e. a set of the bolt 90 and nut 91), on the mounting tongues 61 and 76 laid over each other. With this configuration, mounting of the mounting plate 60 and the supporting plate 75 on the case 11 can be done effectively with the use of the single fixing member (with the set of the bolt 90 and nut 91). This configuration facilitates the mounting of the actuator 35 on the case 11, and reduces the workhour and cost in manufacturing the airbag device M as well as the positioning between the supporting plate 75 and mounting plate 60. More particularly, in the illustrated embodiment, before fastened to the case 11 with the bolt 90 and nut 91, the supporting plate 75 and the mounting plate 60 are temporarily assembled together by putting the projecting tabs 69 and 86 into the slots 72 and 85, which facilitates the fastening with the bolt 90. Moreover, since the mounting plate 60 includes the projecting tongue 63 for preventing the mounting plate 60 from turning during the bolt fastening, and further since the supporting plate 75 and the mounting plate 60 are temporarily assembled together in advance, the actuator 35 can be mounted on the bottom wall 12 in a steady fashion when mounted on the bottom wall 12 with the use of the fixing member (i.e. the set of bolt 90 and nut 91).

Although the invention has been described as embodied into the airbag device for a steering wheel in the foregoing embodiment, the application of the invention should not be limited thereby. By way of example, the invention may also be applied to an airbag device for a passenger seat.

Although the actuator in the foregoing embodiment is used for controlling an internal pressure of the airbag, the control of inflation manner of the airbag is not limited to the control of internal pressure. The actuator may be used to control the contour of the airbag as inflated.

What is claimed is:

1. An airbag device adapted to be mounted on a vehicle, comprising:
    an airbag that is folded and is configured to unfold and be inflated with an inflation gas for protecting a vehicle occupant;
    a housing that houses the airbag;
    a connecting member that extends from the airbag; and
    an actuator that is mounted on the housing and coupled with the connecting member, the actuator being configured to either stay coupled with or be disengaged from the connecting member for controlling an inflation manner of the airbag,
    wherein the actuator includes:
    an actuator body that includes an operating pin which penetrates and thus is coupled with the connecting member as the airbag device is mounted on the vehicle, the actuator body being configured to retract the operating pin and release the connecting member when actuated;
    a mounting plate that holds the actuator body and is secured to the housing; and
    a supporting plate that is secured to the housing at a vicinity of a leading end portion of the operating pin and is disposed opposite to a peripheral portion that is disposed in a periphery of the operating pin such that the connecting member as coupled with the operating pin is disposed between the supporting plate and the peripheral portion, wherein the supporting plate includes a supporting hole for receiving the operating pin, and a flange that is formed in a part of a periphery of the supporting hole toward which the connecting member is to be released, the flange extending along an axial direction of the operating pin towards the leading end portion of the operating pin as passing through the supporting hole for supporting the leading end portion of the operating pin with a surface thereof facing towards the operating pin.

2. The airbag device of claim 1, wherein the operating pin is solid in its entirely from a root portion to the leading end portion which passes through the supporting hole.

3. The airbag device of claim 1, wherein the mounting plate includes:
    a mounting tongue that is disposed in proximity to the supporting plate and secured to the housing;
    a holding plate that is formed generally perpendicularly to the mounting tongue and holds the actuator body, the holding plate including a through hole which the operating pin goes through, and a peripheral portion of the through hole that is fixed to the actuator body such that the holding plate holds the actuator body;

a connecting portion that couples the mounting tongue and the holding plate together and is formed in such a manner as to circumvent the connecting member of the airbag; and an extended tongue that is formed in an edge of the holding plate facing towards the housing, the extended tongue extending generally in parallel to the mounting tongue towards a direction away from the mounting tongue in such a manner that a gap is formed between the housing and the extended tongue.

4. The airbag device of claim 3, wherein the supporting plate and the mounting tongue of the mounting plate are fastened together to the housing.

5. The airbag device of claim 4, wherein the supporting plate and the mounting tongue are fastened together to the housing with a single fixing member in a state in which the supporting plate and the mounting tongue have been temporarily assembled together in advance.

\* \* \* \* \*